United States Patent
Cypris

(10) Patent No.: US 11,873,779 B2
(45) Date of Patent: Jan. 16, 2024

(54) RECIPROCATING-PISTON INTERNAL COMBUSTION ENGINE

(71) Applicant: MAN Truck & Bus SE, Munich (DE)

(72) Inventor: Jochen Cypris, Munich (DE)

(73) Assignee: MAN Truck & Bus SE, Munich (DE)

( * ) Notice: Subject to any disclaimer, the term of this patent is extended or adjusted under 35 U.S.C. 154(b) by 0 days.

(21) Appl. No.: 17/911,062

(22) PCT Filed: Feb. 22, 2021

(86) PCT No.: PCT/EP2021/054286
§ 371 (c)(1),
(2) Date: Mar. 7, 2023

(87) PCT Pub. No.: WO2021/180453
PCT Pub. Date: Sep. 16, 2021

(65) Prior Publication Data
US 2023/0193849 A1    Jun. 22, 2023

(30) Foreign Application Priority Data

Mar. 12, 2020 (DE) ..................... 10 2020 001 638.3

(51) Int. Cl.
*F02F 3/00* (2006.01)
*F02F 3/28* (2006.01)
(Continued)

(52) U.S. Cl.
CPC ............... *F02F 3/285* (2013.01); *F02B 1/12* (2013.01); *F02F 3/26* (2013.01)

(58) Field of Classification Search
CPC ............... F02F 3/28; F02F 3/26; F02F 3/0076
(Continued)

(56) References Cited

U.S. PATENT DOCUMENTS

| | | | | | |
|---|---|---|---|---|---|
| 1,741,032 | A | * | 12/1929 | Minter | ..................... F02B 23/08 123/658 |
| 2,269,084 | A | * | 1/1942 | McCarthy | ............... F02B 23/00 123/65 VC |

(Continued)

FOREIGN PATENT DOCUMENTS

| DE | 1083084 B | 6/1960 |
|---|---|---|
| DE | 1202561 A | 10/1965 |

(Continued)

OTHER PUBLICATIONS

Appel, Wolfgang [u.a.]: Nutzfahrzeugtechnik :Grundlagen, Systeme,Komponenten. 7., überarb. underw. Aufl. Wiesbaden : SpringerVieweg, 2013 (ATZ/MTZ-Fachbuch). Deckblatt u.Inhaltsverzeichnis.—ISBN 978-3-8348-1795-2. DOI:10.1007/978-3-8348-2224-6 (English translation: Appel, Wolfgang [among others]: Commercial Vehicle Technology: Basics, Systems, Components. 7th, revised and ext. Edition Wiesbaden: Springer Vieweg, 2013 (ATZ/MTZ reference book). Cover sheet and table of contents.—ISBN 978-3-8348-1795-2. DOI: 10.1007/978-3-8348-2224-6).

(Continued)

*Primary Examiner* — Long T Tran
*Assistant Examiner* — James J Kim
(74) *Attorney, Agent, or Firm* — Weber Rosselli & Cannon LLP

(57) ABSTRACT

A reciprocating combustion engine includes at least one cylinder, in which a reciprocating piston is arranged back and forth movable. The reciprocating combustion engine includes a pin structure arranged on the combustion chamber side in the area of the cylinder head or the piston bottom. Due to the pin structure, local peak temperatures can be avoided during the combustion process, so that NOx emissions can be avoided or at least greatly reduced. A motor (Continued)

vehicle, for example a commercial vehicle, includes a reciprocating combustion engine.

16 Claims, 6 Drawing Sheets

(51) Int. Cl.
    *F02B 1/12*     (2006.01)
    *F02F 3/26*     (2006.01)

(58) Field of Classification Search
    USPC ........................................................ 123/193.6
    See application file for complete search history.

(56) References Cited

U.S. PATENT DOCUMENTS

| | | | | |
|---|---|---|---|---|
| 3,919,982 | A * | 11/1975 | Goto | F02B 3/04 |
| | | | | 123/193.6 |
| 4,617,888 | A * | 10/1986 | Dent | F02F 3/28 |
| | | | | 123/307 |
| 6,609,490 | B2 * | 8/2003 | Flinchbaugh | F02F 3/28 |
| | | | | 123/193.6 |
| 2004/0261612 | A1 * | 12/2004 | Gillman | F02F 3/0076 |
| | | | | 92/186 |
| 2006/0081212 | A1 | 4/2006 | Hill et al. | |
| 2008/0135007 | A1 * | 6/2008 | Storm | F02P 13/00 |
| | | | | 123/143 C |
| 2016/0017845 | A1 * | 1/2016 | Huang | F02M 21/0221 |
| | | | | 123/495 |
| 2016/0348571 | A1 * | 12/2016 | Huang | F02B 23/0663 |

FOREIGN PATENT DOCUMENTS

| | | |
|---|---|---|
| DE | 2425554 A1 | 1/1975 |
| DE | 4102641 A1 | 4/1992 |
| DE | 19753407 A1 | 6/1999 |
| DE | 10135062 A1 | 2/2003 |
| EP | 0147149 A2 | 7/1985 |
| EP | 3351779 A1 | 7/2018 |
| FR | 2291361 A1 | 6/1976 |
| GB | 2254372 A | 10/1992 |
| JP | H084534 A | 1/1996 |
| JP | H0988609 A | 3/1997 |

OTHER PUBLICATIONS

German Search Report issued in German Patent Application No. 102020001638.3 dated Nov. 3, 2020. No English translation available.

International Search Report and Written Opinion issued in PCT Application No. PCT/EP2021/054286 dated Jun. 4, 2021, with English translation of Search Report.

Notice according to Article 94(3) EPC issued in European Patent Application No. 21707665.2 dated Oct. 4, 2023 with English translation (google translate).

* cited by examiner

RECIPROCATING-PISTON INTERNAL COMBUSTION ENGINE

CROSS-REFERENCE TO RELATED APPLICATIONS

This application is a U.S. National Stage Entry filed under 35 U.S.C. § 371 of International Application No. PCT/EP/2021/054286, filed on Feb. 22, 2021, which claims the benefit of, and priority to, German Patent Application No. DE 10 2020 001 638.3, filed on Mar. 12, 2020, the entire content of each of which is hereby incorporated by reference herein.

BACKGROUND

Technical Field

The present disclosure relates to a reciprocating-piston internal combustion engine and to a motor vehicle, for example a commercial vehicle, having such a reciprocating-piston internal combustion engine.

Background of Related Art

Reciprocating-piston internal combustion engines are well known from the prior art. In embodiments which are customary in practice, a differentiation is made between compression-ignition engines and induced-ignition engines. In both cases, harmful substances are created as a byproduct during the ignition, specifically:
  a) nitrogen oxides, as a result of locally high combustion temperatures;
and in the case of hydrocarbon-based fuels:
  b) soot, as a result of local oxygen starvation and high temperatures;
  c) carbon monoxide, as a result of local oxygen starvation or excessively low temperatures;
  d) hydrocarbons, as a result of local oxygen starvation or excessively low temperatures.

Costly catalytic purification of the combustion gases or a separation of the combustion residues from the exhaust gas flow is required for reasons of environmental protection.

In order for these issues to be addressed, alternative combustion methods which under the heading "homogeneous charge compression ignition" pursue the objective of lowering the raw particle emissions to practically zero and of resolving the conflicting targets of particle emissions and NOx emissions in the future are known from the prior art. The homogeneous charge compression ignition (HCCI) thus represents a new type of engine combustion which pursues the objective of one day operating the internal combustion engine almost free from particle emissions and NOx emissions even without any post-treatment of exhaust gas. While the conventional diesel combustion method forms a non-homogeneous mixture which also combusts in a correspondingly non-uniform manner and with local temperature peaks, HCCI is targeted toward forming an ideally homogeneous mixture and combustion. The homogeneous and lean mixing of air and fuel avoids the rich zones of mixtures that promote the formation of particles. The volumetric combustion without the formation of a flame front, as a result of the high proportion of inert gas, lowers the local peak temperatures during the combustion. Consequently, the thermal generation of NOx, which is the root cause of the majority of NOx emissions, is avoided. The excess air and the very rapid combustion additionally reduce the specific fuel consumption (cf. "Nutzfahrzeugtechnik: Grundlagen, Systeme, Komponenten" ["Commercial Vehicle Engineering: Fundamentals, Systems, Components"] (ATZ/MTZ-Fachbuch)[ATZ/MTZ Textbook], by Erich Hoepke, Stefan Breuer, et al., August 2012 edition).

In practice, an increased fuel input into the oil and increased emissions of CO and HC can be detected with HCCI. Furthermore, monitoring the ignition timing is very complex in practice and sensitive to exhaust gas recirculation rates. Consequently, the basic approaches of homogeneous diesel combustion are suitable only for the lower and medium partial-load operational ranges. Due to these difficulties and the increased performance of exhaust gas post-treatment, basic approaches based on HCCI have been correspondingly unsuccessful in practice.

Furthermore, basic approaches in which a porous medium is incorporated in a combustion chamber are known from the laid-open publications DE 101 35 062 A1 and DE 197 53 407 A1. The porous medium forms a porous reactor (porous burner) and in this way fundamentally makes possible combustion without harmful substances in that a homogeneous temperature field is achieved, the latter throughout being below the temperature at which nitrogen oxides (NOx) are formed and throughout adequately high for the complete oxidation of HC and CO. However, in the case of this basic approach it is disadvantageous that the fitting of a porous structure within the combustion chamber has not yet been solved in technical terms, and tension fissures in the case of basic approaches to date have led to fragments which result in mechanical damage to the piston/cylinder unit.

SUMMARY

An object of the present disclosure is to provide a reciprocating-piston internal combustion engine which generates fewer harmful substances during combustion and in addition makes possible a reduction in CO2.

These objects are achieved by a reciprocating-piston internal combustion engine having the features of the independent claim. Embodiments of the present disclosure are the subject matter of the dependent claims and will be explained in more detail in the description hereunder with occasional reference to the figures.

It has been established in the context of the present disclosure that when a pin-type structure instead of a porous material is incorporated in the combustion chamber and the combustion takes place within and/or in the region of this pin-type structure, a significant reduction up to the point of avoiding the generation of harmful substances in the combustion process can likewise be achieved. Moreover, a pin-type structure of this type is substantially more suitable for the practical use in reciprocating-piston internal combustion engines. Accordingly provided according to a general aspect of the present disclosure is a reciprocating-piston internal combustion engine, including at least one cylinder in which a reciprocating piston is disposed so as to be movable in a reciprocating manner. Each cylinder has a combustion chamber which is able to be compressed by the movement of the piston. The reciprocating-piston internal combustion engine includes a pin structure that is disposed or provided in the combustion chamber in the region of the cylinder head and/or of the piston crown.

The pin structure according to the present disclosure offers the particular advantage that the same effects as in homogeneous combustion can be achieved, e.g. the generation of harmful substances in the combustion process can be largely avoided. In comparison to conventional embodiments of combustion chambers of internal combustion engines, the pin-type structure enables the generation of a homogeneous temperature field, the latter throughout being below the temperature at which nitrogen oxides are formed and throughout adequately high for the complete oxidation of HC and CO. The pin-type structure furthermore avoids the disadvantages of a porous burner, because the pin-type structure can be embodied so as to be correspondingly stable such that the latter is suitable for practical use in internal combustion engines. The provision of a pin-type structure in the combustion chamber of an internal combustion engine according to the present disclosure thus enables an advantageous approximation of the principle of homogeneous combustion. Even while no perfect homogeneous combustion is able to be achieved therewith, a largely homogeneous temperature field is however enabled by the pin-type structure such that substantially the same effects and advantages can be achieved as in homogeneous combustion. As a result of a late injection strategy, monitoring of the ignition timing is maintained, and the hot pin structure promotes a rapid generation of the mixture. The combustion in this instance may take place entirely within the combustion chamber provided with pins, such that the generation of harmful substances during the combustion can be avoided or at least heavily reduced by way of this particular design of the combustion chamber. Hot gas for the operative process continuously flows out of the combustion chamber.

A pin structure is understood to be a pin-type structure which has a plurality or a multiplicity of pins, and/or a device which is configured by a plurality of pins.

The term "pin" may include all slender shapes of which the longitudinal extent is greater than the diameter of said shapes at the thinnest point. In the case of non-elliptic cross sections, the height is greater than the thinnest wall thickness.

The pin structure includes pins of which the longitudinal extent is longer than the diameter of said pins. The pins of the pin structure can be embodied so as to be cylindrical and/or in the shape of studs, e.g. can have a circular cross section in terms of a section plane which is perpendicular to the direction of movement of the piston. Alternatively or additionally however, the pins can also have a rectangular, a crescent-shaped, a star-shaped and/or any other cross section in this section plane.

The pins of the pin structure can optionally extend so as to be parallel or substantially parallel to the direction of movement of the piston. The pin structure by way of the surface thereof can be configured to develop a heat-storing and/or temperature-equalizing effect during combustion in the combustion chamber. Furthermore, the pin structure can be a pin structure for homogenizing a mixture generation and/or a combustion or at least for promoting a more homogeneous mixture generation and/or a combustion in the combustion chamber. Homogenizing the mixture generation or the combustion is presently understood to mean no perfect or ideal homogenization. Rather, the pin structure results in a more homogeneous mixture generation or combustion in comparison to conventional combustion chambers without a pin structure, such that the advantages and positive effects of ideal homogenization, such as the reduction of NOx, can at least be approximated as a result.

The pins by way of the surface thereof have a temperature-equalizing effect. Hot regions, so-called hotspots, are cooled and temperature sinks are heated. This behavior has an effect on the mechanism by way of which individual components of harmful substances are generated. The temperature at which thermal nitrogen oxides are generated is not even locally exceeded. Temperature sinks, the root cause of CO and HC emissions, are thus avoided. The method is fundamentally suitable for any fuel which in a later injection strategy can be supplied to the system in sufficient quantities.

The pin structure is disposed such that said pin structure is situated in the compression chamber of the combustion chamber when the piston is in the top dead center (hereunder referred to as TDC for short), e.g. is in the TDC position. In other words, the pin structure is disposed in a region of the combustion chamber in which combustion of the compressed air/fuel mixture takes place. In other words, the pin structure is disposed in and/or within the compression chamber of the combustion chamber at least at the point in time when the piston is at the TDC.

In one embodiment, the pin structure occupies a volumetric proportion in the range from 5% to 40% of the combustion chamber when the reciprocating piston is at the TDC. In other words, the pin structure occupies a volumetric proportion in the range from 5% to 40% of the compression chamber. This means accordingly that in this embodiment 60% to 95% by volume of the compression chamber is occupied by the combustion mixture or air.

In embodiments, the pin structure occupies a volumetric proportion in the range from 10% to 20% of the combustion chamber when the reciprocating piston is at the TDC. In other words, the pin structure according to this variant occupies a volumetric proportion in the range from 10% to 20% of the compression chamber. This means accordingly that in this variant 80% to 90% by volume of the compression chamber is occupied by the combustion mixture or air. In the context of the present disclosure these ranges are particularly advantageous in order to achieve or at least approximate homogenization of the mixture generation and/or of the combustion in the combustion chamber.

As noted hereinabove, the pin structure can be disposed in the combustion chamber in the region of the piston crown. In one embodiment thereof, the pin structure is disposed in a bowl of the piston crown. This enables a particularly compact embodiment of the cylinder/piston assembly. The piston here is embodied as a bowl piston. Alternatively or additionally, the pin structure can extend in the manner of stalagmites in the direction of the combustion chamber, e.g. proceeding from the piston crown can extend in the manner of pins in the direction toward the cylinder head, for example extend in the manner of rods or columns or in the shape of cones into the combustion chamber.

As noted hereinabove, the pin structure can be disposed in the combustion chamber in the region of the cylinder head. In an embodiment thereof, the pin structure is disposed in a recess of the cylinder head. Alternatively however, the pin structure can also be disposed below the cylinder head. The term "below" refers to a normal installation position of the engine, e.g. the cylinder head in terms of the direction of gravitation is situated above the piston and the cylinder jacket. Alternatively or additionally, the pin structure in the manner of stalagtites can extend from the cylinder head in the direction of the combustion chamber, e.g. proceeding from a region in or below the cylinder head can extend in the shape of pins toward the combustion chamber, for example extend in the manner of rods or columns or in the shape of cones into the combustion chamber.

According to one further embodiment, the pin structure can include at least 10 pins. It is envisioned that the pin structure includes at least 20 or at least 30 pins, or at least 40 pins. The number of pins can be expediently determined for a specific reciprocating-piston internal combustion engine while taking into account the following considerations. In practice, the combustion chamber diameter, or the engine size, respectively, influences the number of pins, on the one hand. Furthermore, it is to be noted that a small pin diameter is desirable, on the one hand. The smaller the pin diameter, the higher the number of pins and thus larger the surface of the pin structure for the heat-storing and/or temperature-equalizing effect. On the other hand, the pin diameters must not be chosen to be so small that the stability of the pin structure in the operation of the reciprocating-piston internal combustion engine is compromised as a result. The number of pins can be determined and optimized by suitable tests.

Alternatively or additionally, the plurality of pins of the pin structure can be mutually spaced apart, e.g., in such a manner that the pins are disposed without being interconnected in the combustion chamber. It is avoided as a result that the pins are distorted and break.

In one embodiment, the reciprocating-piston internal combustion engine has a baffle pin which for deflecting and/or distributing introduced fuel toward the pin structure is disposed in the region of the pin structure. This enables fuel to be introduced at a more acute introduction angle, for example at a more acute injection angle in the case of liquid fuel or a more acute injection angle in the case of gaseous fuel, than is otherwise customary. The fuel here is introduced such that said fuel at least partially impacts the baffle pin and by the latter is deflected toward the pin structure. This enables a particularly efficient distribution of fuel in the combustion chamber and avoids the ingress of fuel into the annular gap between the piston and the liner. In embodiments, the baffle pin in terms of an introduction direction of the fuel into the combustion chamber and the pin structure is disposed and configured in such a manner that introduced fuel at least largely impacts the baffle pin and by the latter is deflected and/or distributed in the radial direction toward the pin structure. For example, the baffle pin can be disposed in a central region of the pin structure. Alternatively or additionally, the baffle pin in terms of the direction of movement of the piston can have a lower height than the pin structure.

The pin structure can be formed from a metallic material, this enabling advantageous production. Furthermore, the pin structure can be formed from a ceramic material, this being particularly advantageous from thermal viewpoints. It is also conceivable that the pin structure is produced from a composite material, such as from a metallic material and a ceramic material.

In one further embodiment, the reciprocating-piston internal combustion engine is configured to supply to the combustion chamber a pressurized fuel required for a combustion procedure in only one injection procedure shortly before or when the TDC is reached. In general terms, this may be an air-compressing engine with direct supply of fuel at a later stage, e.g. close to the TDC.

In an embodiment thereto, the reciprocating-piston internal combustion engine can be configured to enable a partially homogeneous combustion by splitting the mixture generation. The reciprocating-piston internal combustion engine here can be configured a) to supply to the combustion chamber a sub-quantity of a fuel required for the combustion procedure, for generating a lean, non-ignitable mixture; b) to subsequently compress the lean, non-ignitable mixture by a movement of the piston toward the TDC; and c) to subsequently supply a residual quantity of the fuel required for a combustion procedure in the region of the TDC, for initiating the compressed ignition or the induced ignition. This embodiment, e.g. the compression of a lean (non-ignitable) mixture with subsequent compressed ignition or induced ignition by direct supply of fuel at a later stage, enables a partially homogenized combustion having advantages in terms of the generation of harmful substances, without the disadvantage of excessively steep pressure gradients as a result of the damping effect of the pin-shaped structure.

It is furthermore to be emphasized that the basic approach according to the present disclosure, e.g. providing a pin structure for promoting the homogenization of the mixture generation and a combustion in the combustion chamber, is not limited to a specific internal combustion engine. Accordingly, the internal combustion engine can be an internal combustion engine operated by gaseous or liquid fuel, for example an internal combustion engine operated with diesel fuel or gasoline. In embodiments, the internal combustion engine is a reciprocating-piston internal combustion engine as has been described above.

It is envisioned that the present disclosure can be applied to any internal combustion engine in which an operative gas is compressed, heat is released by the combustion of an added fuel, and a volumetric expansion generated as a result of the combustion is utilized for the benefit of mechanical work. In accordance with another aspect of the present disclosure is a device for converting heat into work, wherein a gaseous or liquid fuel is added to a compressible operative gas and is subsequently combustible, and wherein the volumetric expansion generated during the combustion is able to be converted into mechanical work, and wherein a pin-type structure is disposed in the combustion chamber of the device in such a manner that the combustion takes place within or largely within the pin-type structure. The pin-type structure can have features of the optional embodiments described above such as, for example, relating to the number of pins, the volumetric proportion of the pin structure in relation to the quantity of air in the combustion chamber, etc.

The present disclosure furthermore relates to a motor vehicle having a device for converting heat into work, such as a reciprocating-piston internal combustion engine, having the pin structure as described in the present disclosure. The motor vehicle may be a commercial vehicle. In other words, the motor vehicle can be a motor vehicle which, as a result of the construction mode and equipment thereof, is conceived for conveying passengers, for transporting goods, or for towing trailers. For example, the motor vehicle can be a truck, a bus and/or a tractor/semitrailer combination.

The present disclosure also relates to a machine or a stationary application, for example a combined heat and power plant, including a reciprocating-piston internal combustion engine having the pin structure as described in the present disclosure. The present disclosure also relates to vehicles of any type, including a reciprocating-piston internal combustion engine having the pin structure as described in the present disclosure. The vehicle may be a watercraft, for example a ship, or an aircraft, for example an airplane.

The terms "combustion chamber" and "compression chamber" of a cylinder used above are usually understood to mean the following:

The combustion chamber (Vb) is the volume enclosed by the cylinder, the piston and the cylinder head. Said combustion chamber (Vb) is a function of the position of the piston, thus a function of time during operation. The compression chamber (Vb_min=Vc) is understood to mean the smallest possible chamber when the piston is at the TDC. When the piston is at the bottom dead center (BDC), the following applies:

Vb=Vh+Vc, where Vh is the cylinder cubic capacity and Vc is the compression chamber.

The cubic capacity Vh, also referred to as cylinder displacement, for cylinders of piston engines as is known refers to the enclosed volume resulting from the operating travel of the individual piston stroke and the effective cross-sectional area of the piston. Said cubic capacity Vh thus defines the volume which in an engine is displaced in total by the stroke of all pistons.

It is envisioned that the embodiments and features of the present disclosure can be combined with one another in an arbitrary manner.

BRIEF DESCRIPTION OF THE DRAWINGS

Various aspects of the present disclosure will be described hereunder with reference to the appended drawings in which.

Identical or equivalent elements are identified by the same reference signs in all the figures and occasionally are not separately described.

Figure 1:
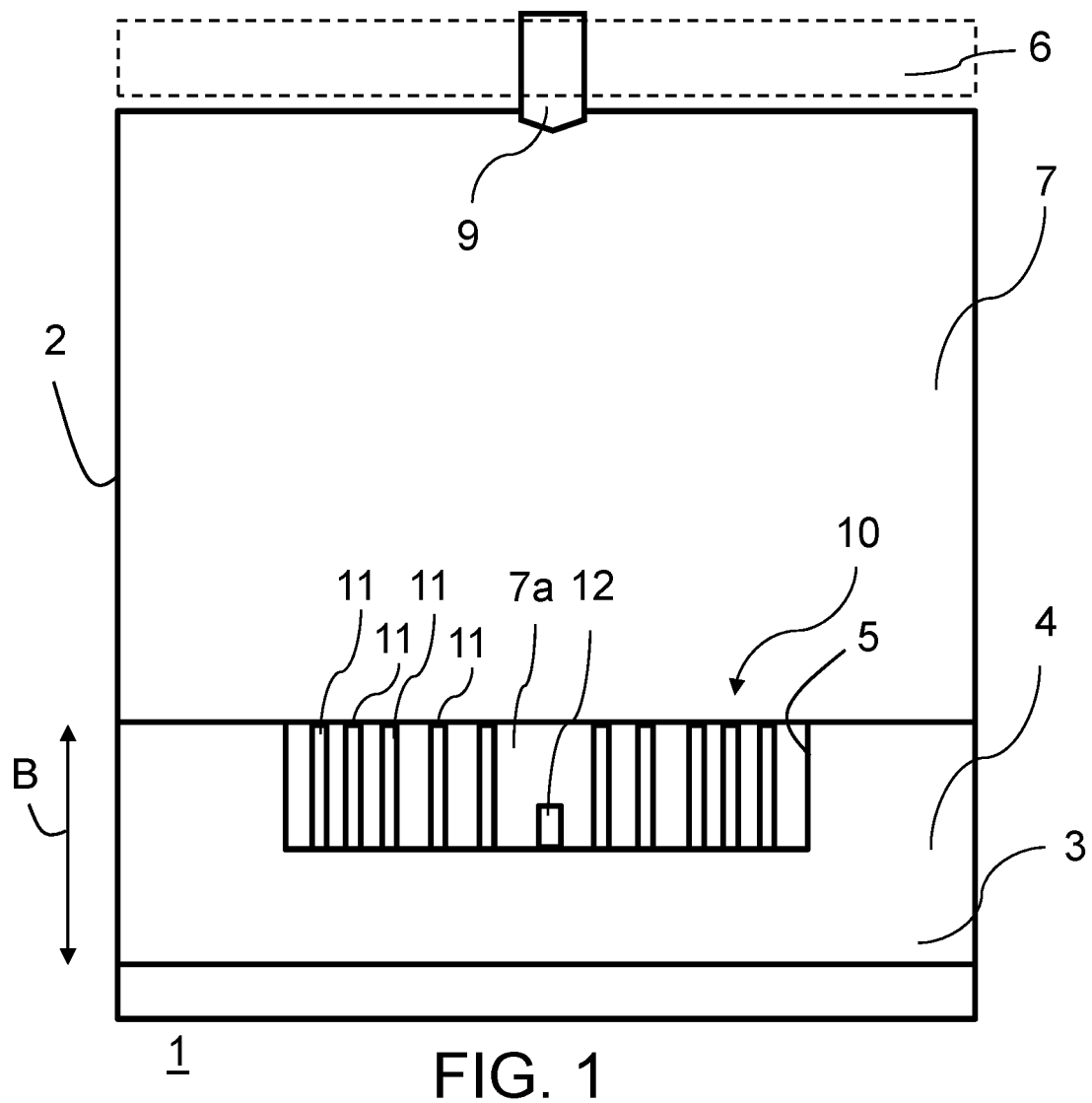
FIG. 1 shows a schematic cross-sectional view of a reciprocating-piston internal combustion engine according to one embodiment of the present disclosure.

FIG. 1 shows a schematic cross-sectional view of a reciprocating-piston internal combustion engine according to one embodiment of the present disclosure. In order to simplify the illustration, only one of a plurality of cylinders 2 of the reciprocating-piston internal combustion engine 1 is illustrated, a reciprocating piston 3 being disposed so as to be movable in a reciprocating manner in said cylinder 2. The reciprocating-piston internal combustion engine 1 in the present example, in a purely exemplary manner, is a diesel internal combustion engine, wherein the present disclosure is not limited thereto, as has already been established above.

The reciprocating piston 3 is embodied as a bowl piston. A pin structure 10 which leads to a more homogeneous mixture generation or combustion in comparison to conventional combustion chambers without a pin structure is disposed in a bowl 5 of the piston crown 4, such that the advantages and positive effects of an ideal homogenization, such as the reduction of NOx, can be at least approximated as a result.

The pin structure 10 has a multiplicity of pins 11. The pins by way of the surface thereof have a temperature-equalizing effect. Hotspots are cooled, and temperature sinks are heated by the pins 11. This behavior has an effect on the generation mechanisms of individual components of harmful substances. The temperature at which thermal nitrogen oxides are generated is not even locally exceeded; temperature sinks, which are the root cause of CO and HC emissions, are avoided. The method is fundamentally suitable for any fuel which in a later injection strategy can be supplied to the system in sufficient quantities.

The stud-shaped pins 11 made from a metallic material here are fastened so as to be mutually spaced apart in the piston crown 4 and are not interconnected in the combustion chamber 7. The pins 11 extend in the manner of stalagmites so as to be mutually parallel in the direction of the combustion chamber 7, or so as to be parallel to the direction of movement B of the piston 3, respectively. Alternatively, the pin structure can also be disposed in the combustion chamber in the region of the cylinder head, as has already been described above. The cylinder head here is only schematically indicated by the dashed line 6.

The pin structure 10 is disposed in the combustion chamber such that the combustion takes place completely or almost completely within the combustion chamber provided with pins. When the piston 3 is at the TDC position, the bowl 5 of the piston crown 4 is part of the compression chamber 7a of the combustion chamber 7 in which combustion of the compressed air/fuel mixture takes place.

Figure 2:
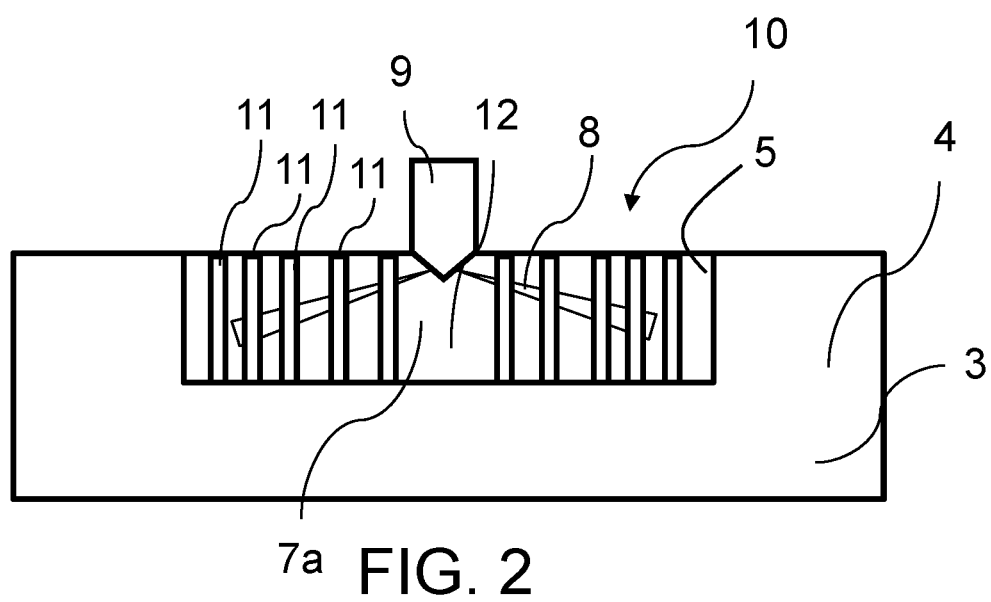
FIG. 2 shows a piston having a pin structure according to one embodiment of the present disclosure.

FIG. 2 shows a cross-sectional view of a piston 3 at a TDC position at the time point of a late fuel injection. The cylinder 2 has not been illustrated here but is embodied as illustrated in FIG. 1.

The fuel 8 here, by an injection nozzle 9, is supplied highly pressurized just before the TDC. In principle, the fuel type here is irrelevant. By way of example, diesel fuel is presently injected. The pressure is required in order to supply the complete fuel quantity in a short time. The combustion then takes place completely within the compression chamber 7a provided with pins. Hot gas for the operative process continuously flows out of the combustion chamber. Heat from the compression and the combustion process is stored in the pins 11. The thermal interaction takes place primarily between air, or combustion gas, respectively, and the pins 11, or the pin structure 10, respectively. As has already been discussed above, local temperature peaks and temperature sinks in the combustion gas are reduced as a result of the thermal interaction, and the generation of harmful substances is thus prevented or at least minimized.

A baffle pin 12 for deflecting and/or for distributing introduced fuel 8 toward the pin structure 10 can optionally be provided in the region of the pin structure 10. The baffle pin 12 is disposed in a central region of the pin structure 10 and in terms of an introduction direction of the fuel into the combustion chamber and the pin structure 10 is disposed and configured in such a manner that introduced fuel 8 at least largely impacts the baffle pin and by the latter is deflected and/or distributed in the radial direction toward the pin structure 10. FIG. 1 shows an embodiment with a baffle pin 12. In contrast, FIG. 2 shows a piston 3 without a baffle pin.

Figure 3:
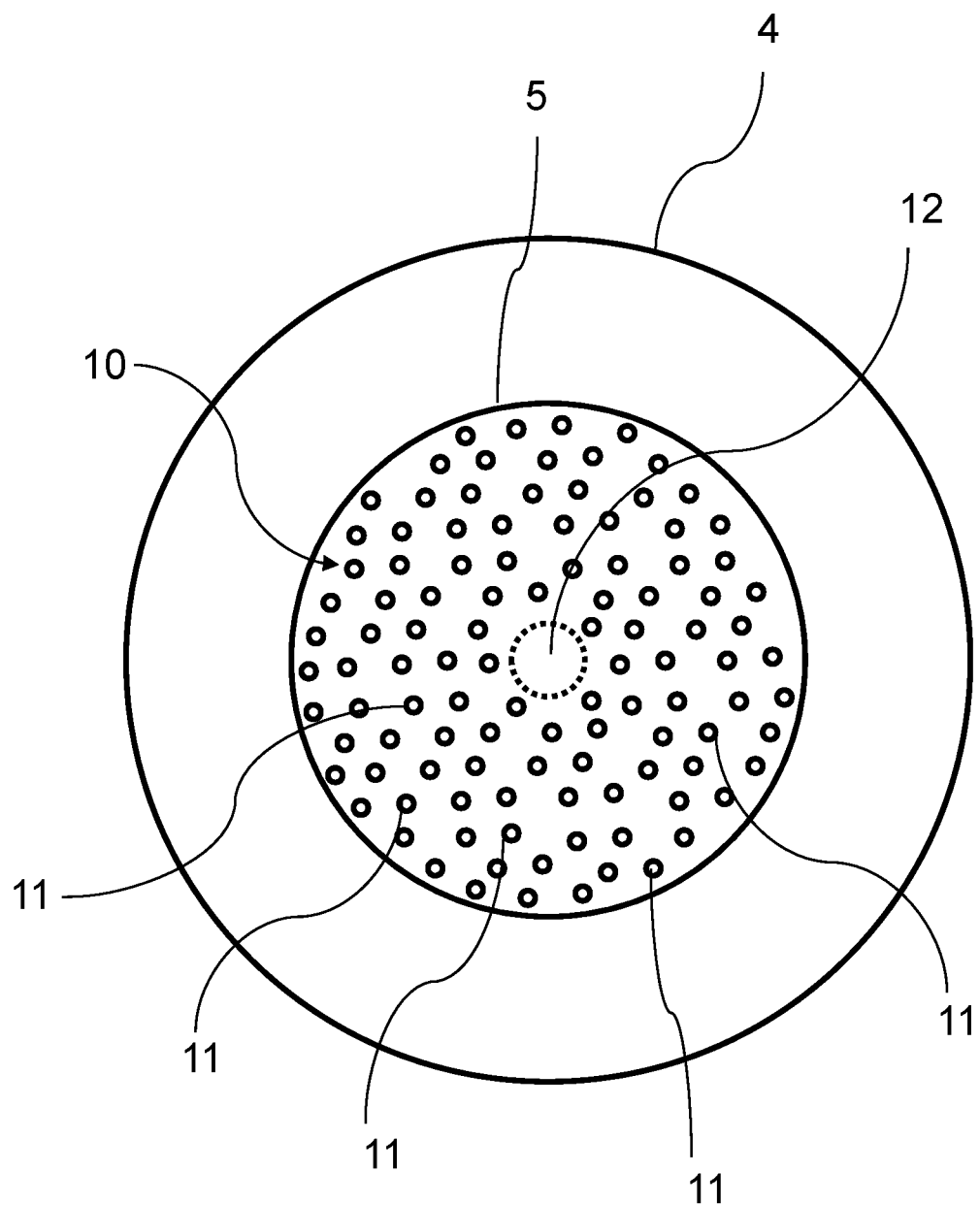
FIG. 3 shows a plan view from above of a bowl piston having a pin structure according to one embodiment of the present disclosure.

FIG. 3 shows a plan view from above of a bowl piston 3 having the pin structure 10 of FIG. 1. It can be seen that a multiplicity of pins 11 are disposed so as to be substantially uniformly distributed in the bowl 5 of the piston crown 4. However, this represents only a non-limiting embodiment.

For producing the pin structure, bores can be incorporated into the bowl piston 3, the pins 11 for configuring the pin structure 10 then being press-fitted into said bores.

However, a production of the bowl piston 3 having an integrated pin structure 10 is also possible by means of a 3D printing method, for example by means of a laser or arc welding 3D printing method. The bowl piston 3 having an integrated pin structure 10 can also be produced as a casting.

Figure 4:
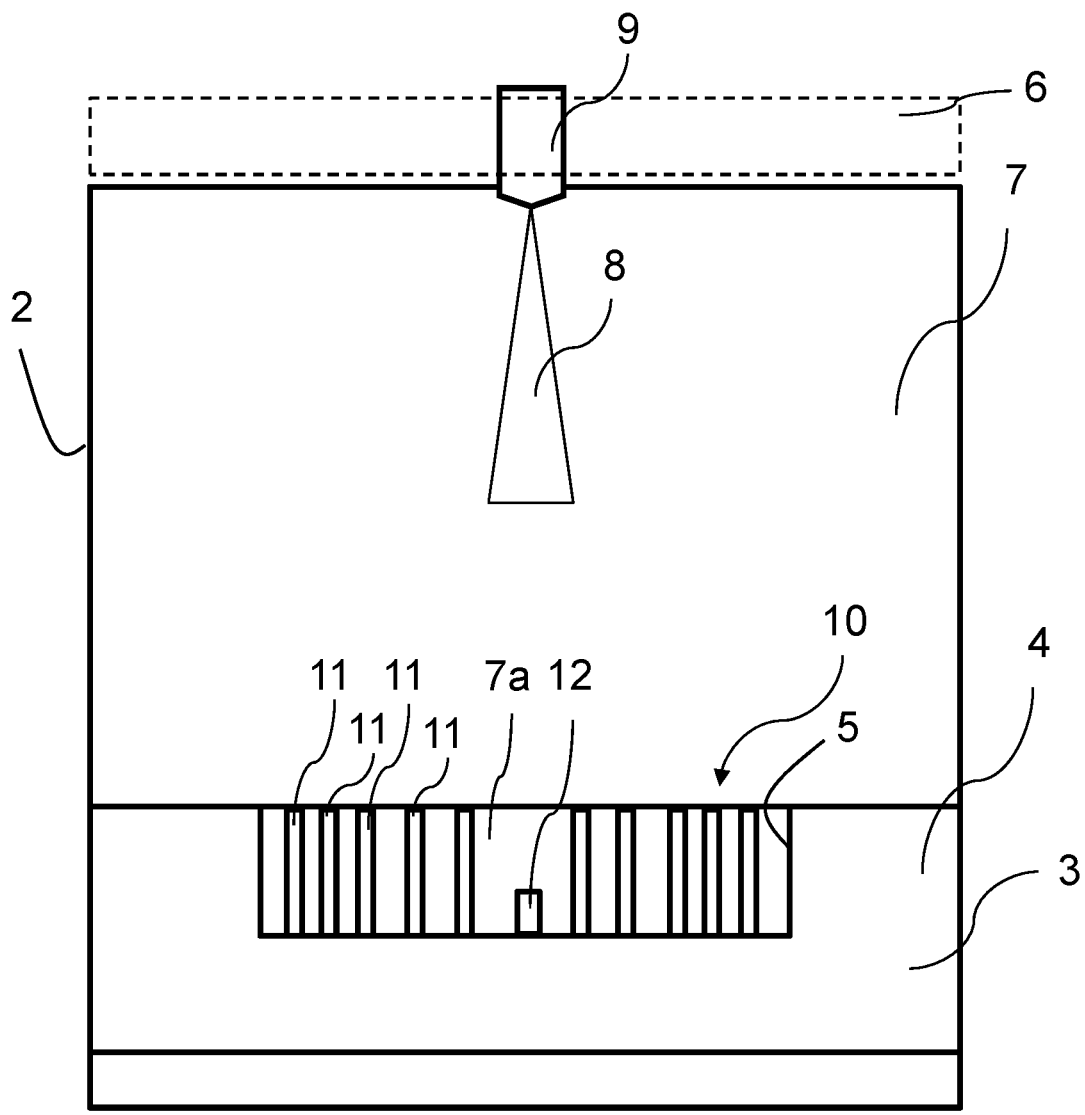
FIGS. 4 to 6 shows an illustration of a combustion procedure using a reciprocating-piston internal combustion engine according to one embodiment of the present disclosure.
Figure 5:
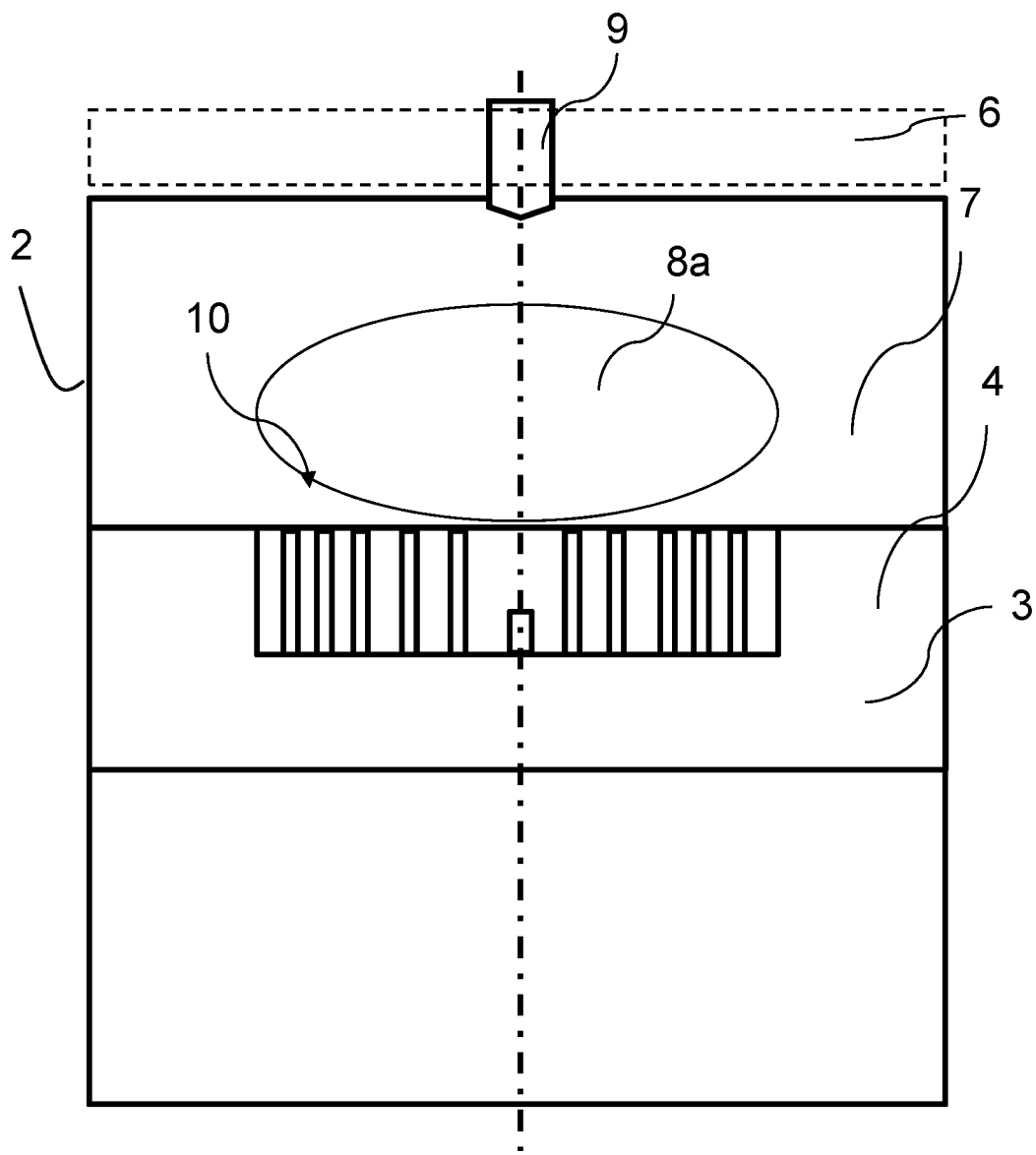
Figure 6:
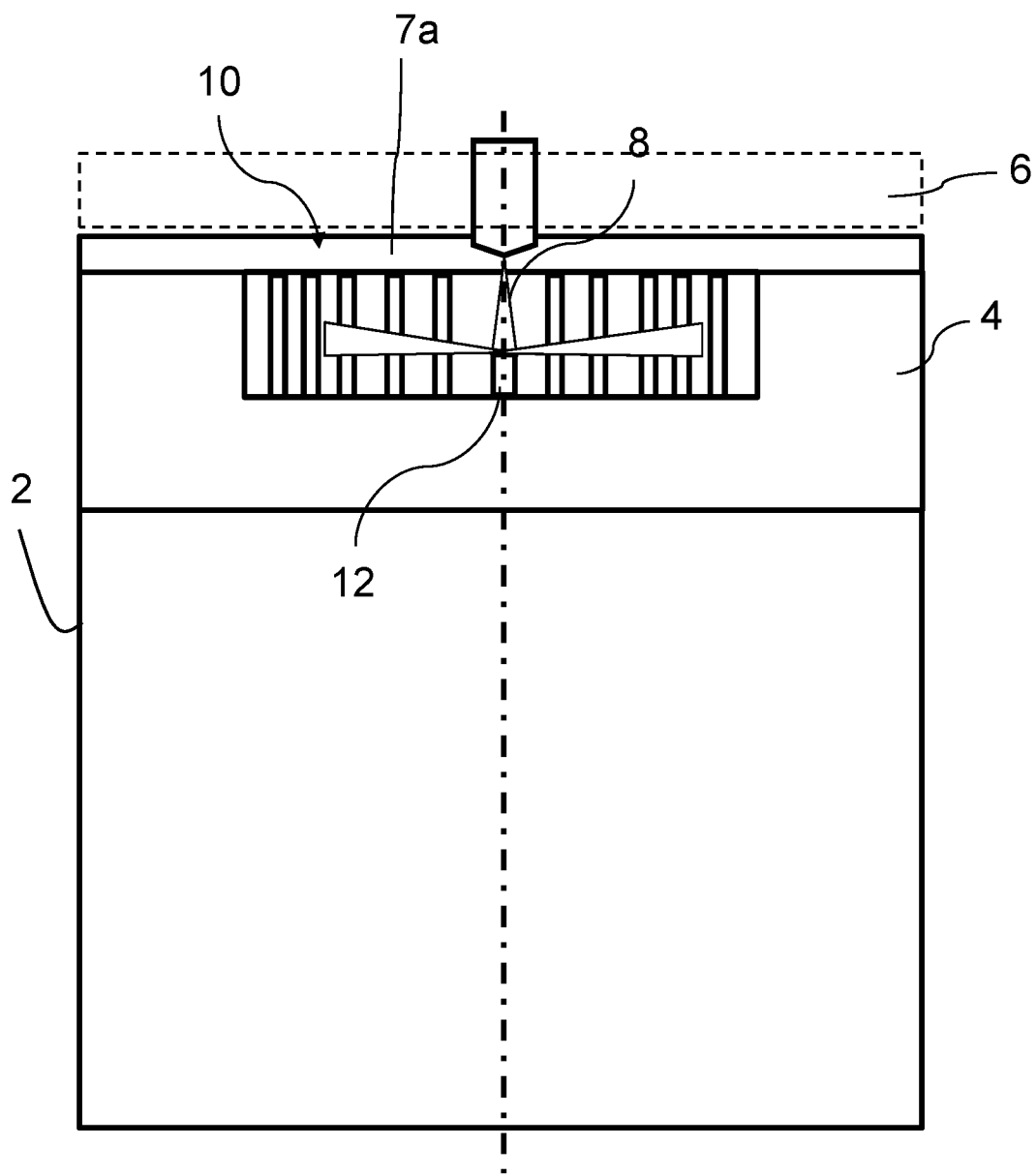

FIGS. 4 to 6 show an illustration of a combustion procedure using a reciprocating-piston internal combustion engine according to an embodiment with the same combustion chamber principle. As opposed to the compressing engine which is shown in a diagram in FIG. 2 and has a direct fuel supply at a later stage in the proximity of the TDC, the embodiment illustrated in FIGS. 4 to 6 is a partially homogeneous combustion by splitting the mixture generation.

The reciprocating-piston internal combustion engine 30 here is configured to initially supply to the combustion chamber 7 a sub-quantity of a fuel required for a combustion procedure, for forming a lean, non-ignitable mixture. This is shown in FIG. 4. The piston 4 having the pin structure 10 is at the bottom dead center (BDC) or close to the BDC. An early, direct centric supply of fuel during the "intake open" phase of the intake valves (not illustrated) takes place by way of the injection nozzle 9. The objective here is generating a lean mixture 8a in the center of the cylinder. In this manner, no compression of fuel in the annular gap between the liner and the piston takes place as a result of this centric fuel supply. As is illustrated in FIG. 5, compressing of the lean, non-ignitable mixture 8a subsequently takes place by a movement of the piston toward the TDC, and subsequently a residual quantity of the fuel required for a combustion procedure is supplied in the region of the TDC for initiating the compressed ignition or the induced ignition, this being illustrated in FIG. 6.

The centric injection jet 8 here is radially deflected and distributed on the baffle pin 12. This results in a partially homogenized combustion that enables a reduced generation of harmful substances without the disadvantage of excessively steep pressure gradients as a result of the damping effect of the pin structure 10.

Figure 7:
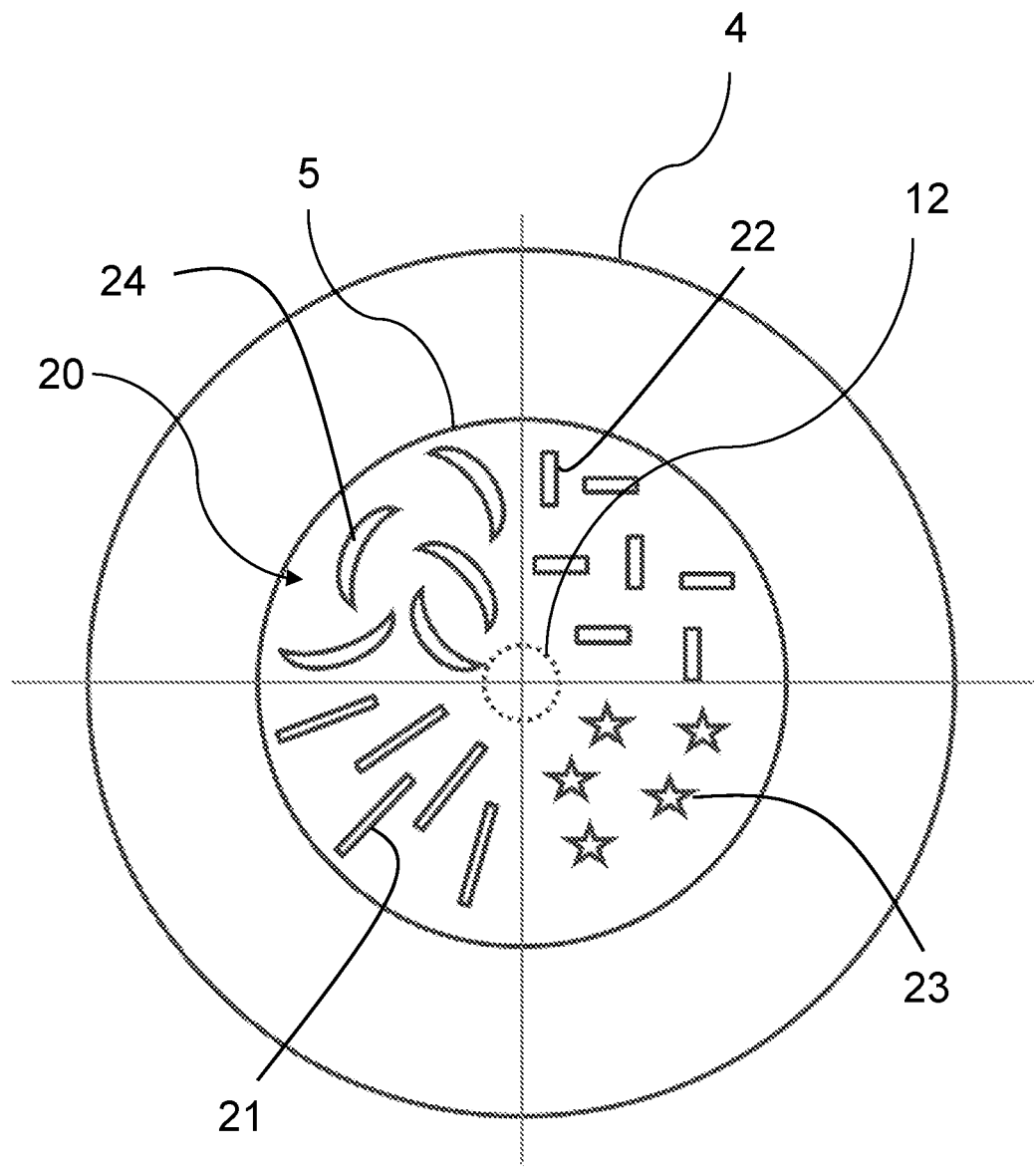
FIG. 7 shows a plan view from above of a bowl piston having an alternative pin structure according to one further embodiment of the present disclosure.

FIG. 7 shows a plan view from above of a bowl piston 4 having an alternative pin structure 20 according to one further embodiment of the present disclosure. It can be seen that a multiplicity of pins 21, 22, 23, 24 are disposed in the bowl 5 of the piston crown 4. As opposed to the embodiment of FIG. 3, the pins do not have a circular cross section. Alternatively or additionally to pins having a circular cross section, the pin structure can instead have pins with other cross sections, for example pins 21, 22 with a rectangular cross section and/or pins 24 with a crescent-shaped cross section and/or pins 23 with a star-shaped cross section and/or pins with any other cross section.

While the present disclosure has been described with reference to a preferred embodiments, it is obvious to a person skilled in the art that various modifications can be embodied and equivalents be used as a replacement without departing from the scope of the present disclosure. Consequently, the present disclosure is not intended to be limited to the disclosed embodiments but to include all embodiments which are within the scope of the appended patent claims. The present disclosure also claims protection for the subject matter and the features of the dependent claims independently of the claims to which reference is made.

LIST OF REFERENCE SIGNS

1 Reciprocating-piston internal combustion engine
2 Cylinder
3 Reciprocating piston
4 Piston crown
5 Bowl
6 Cylinder head
7 Combustion chamber
7a Combustion chamber region
8 Fuel, for example injected diesel fuel
8a Lean mixture
9 Injection nozzle
10 Pin structure
11 Pin of the pin structure
12 Baffle pin
20 Pin structure
21 Pin of the pin structure
22 Pin of the pin structure
23 Pin of the pin structure
24 Pin of the pin structure
30 Reciprocating-piston internal combustion engine
B Direction of movement of the piston

What is claimed is:

1. A reciprocating-piston internal combustion engine, comprising at least one cylinder in which a reciprocating piston is disposed so as to be movable in a reciprocating manner, a cylinder head, the reciprocating piston having a piston crown, a combustion chamber formed between the cylinder head and the piston crown, wherein a pin structure comprising a plurality of pins is disposed in the combustion chamber in the region of the cylinder head or of the piston crown, and further comprising a baffle pin being disposed in the region of the pin structure for deflecting or distributing introduced fuel toward the pin structure, wherein the baffle pin comprises at least one of the following attributes:
   a) a diameter of the baffle pin is larger than a diameter of the pins,
   b) the baffle pin is shorter than the pins.

2. The reciprocating-piston internal combustion engine as claimed in claim 1, wherein the pin structure, by way of the surface thereof is configured to develop a heat-storing or temperature-equalizing effect during combustion in the combustion chamber; or
   is a pin structure for homogenizing a mixture generation or a combustion in the combustion chamber, or is a pin structure for promoting a more homogeneous mixture generation or combustion in the combustion chamber.

3. The reciprocating-piston internal combustion engine as claimed in claim 1, wherein the pin structure occupies a volumetric proportion in the range from 5% to 40% of the combustion chamber when the reciprocating piston is at the top dead center, TDC.

4. The reciprocating-piston internal combustion engine as claimed in claim 3, wherein the pin structure occupies a volumetric proportion int eh range from 10% to 20% of the combustion chamber when the reciprocating piston is at the top dead center, TDC.

5. The reciprocating-piston internal combustion engine as claimed in claim 1, wherein the pin structure, disposed in the combustion chamber in the region of the piston crown, is disposed in a bowl of the piston crown or extends in the manner of stalagmites in the direction of the combustion chamber.

6. The reciprocating-piston internal combustion engine as claimed in claim 1, wherein the pin structure, disposed in the combustion chamber in the region of the cylinder head is dispose din the cylinder head; or
   is disposed in a recess of the cylinder head; or
   is disposed below the cylinder head; or
   from the cylinder head extends in the manner of stalagtites in the direction of the combustion chamber.

7. The reciprocating-piston internal combustion engine as claimed in claim 1, wherein the pin structure includes a plurality of pins, or is configured by a plurality of pins.

8. The reciprocating-piston internal combustion engine as claims in claim 7, wherein,
   the pin structure includes at least 10 pins; or
   the pin structure includes at least 20 pins; or
   the pin structure includes at least 30 pins; or the plurality of pins is disposed so as to be mutually spaced apart or so as not to be interconnected in the combustion chamber.

9. The reciprocating-piston internal combustion chamber as claimed in claim 7, wherein,
   a length of the plurality of pins is greater than the diameter of the pins; or
   the plurality of pins is embodied so as to be cylindrical or in the shape of studs; or
   the plurality of pins extend so as to be parallel or substantially parallel to the direction of movement of the piston.

10. The reciprocating-piston internal combustion engine as claimed in claim 1, wherein the baffle pin is disposed in a central region of the pin structure; or
    in terms of an introduction direction of the fuel into the combustion chamber and the pin structure is disposed and configured such that introduced fuel at least largely impacts the baffle pin and by the latter is deflected or distributed in the radial direction toward the pin structure.

11. The reciprocating-piston internal combustion engine as claimed in claim 1, wherein the pin structure is formed from a metallic material or a ceramic material.

12. The reciprocating-piston internal combustion engine as claimed in claim 1, wherein the pin structure, when the piston is at the TDC position, is disposed in the compression chamber of the combustion chamber or in a region of the combustion chamber in which combustion of the compressed air/fuel mixture takes place.

13. The reciprocating-piston internal combustion engine as claimed in claim 1, wherein the reciprocating-piston internal combustion engine is a reciprocating-piston internal combustion engine which is operated using gaseous of liquid fuel.

14. The reciprocating-piston internal combustion engine as claimed in claim 1, wherein the reciprocating-piston internal combustion engine is configured to supply to the combustion chamber a pressurized fuel required for a combustion procedure in only one injection procedure before or when the top dead center is reached.

15. The reciprocating-piston internal combustion engine as claimed in claim 1, wherein the reciprocating-piston internal combustion engine is configured to supply to the combustion chamber a sub-quantity of a fuel required for a combustion procedure, for generating a lean, non-ignitable mixture by a movement of the piston toward the top dead center; and
    to subsequently supply a residual quantity of the fuel required for a combustion procedure in the region of the top dead center, TDC, for initiating the compressed ignition or the induced ignition.

16. A motor vehicle, comprising:
    a reciprocating-piston internal combustion engine, the reciprocating-piston internal combustion engine including at least one cylinder in which a reciprocating piston disposed so as to be movable in a reciprocating manner, a cylinder head, the reciprocating piston having a piston crown, a combustion chamber formed between the cylinder head and the piston crown, wherein a pin structure comprising a plurality of pins is disposed in the combustion chamber in the region of the cylinder head or of the piston crown; and further comprising a baffle pin being disposed in the region of the pin structure for deflecting or distributing introduced fuel toward the pin structure, wherein the baffle pin comprises at least one of the following attributes:
    a) a diameter of the baffle pin is larger than a diameter of the pins,
    b) the baffle pin is shorter than the pins.

\* \* \* \* \*